US012679155B2

(12) United States Patent
Otsu

(10) Patent No.: US 12,679,155 B2
(45) Date of Patent: Jul. 14, 2026

(54) ELASTIC CONNECTION TOOL FOR SUSPENSION AND VEHICLE BODY MOUNT STRUCTURE FOR SUSPENSION

(71) Applicant: Prospira Corporation, Kawasaki city (JP)

(72) Inventor: Kazutaka Otsu, Kawasaki city (JP)

(73) Assignee: Prospira Corporation, Kawasaki city (JP)

( * ) Notice: Subject to any disclaimer, the term of this patent is extended or adjusted under 35 U.S.C. 154(b) by 0 days.

(21) Appl. No.: 19/110,096

(22) PCT Filed: Jul. 25, 2023

(86) PCT No.: PCT/JP2023/027280
§ 371 (c)(1),
(2) Date: Mar. 10, 2025

(87) PCT Pub. No.: WO2024/070175
PCT Pub. Date: Apr. 4, 2024

(65) Prior Publication Data
US 2026/0070384 A1      Mar. 12, 2026

(30) Foreign Application Priority Data
Sep. 29, 2022     (JP) ................................. 2022-157034

(51) Int. Cl.
*B60G 7/02*          (2006.01)
(52) U.S. Cl.
CPC ..................................... *B60G 7/02* (2013.01)
(58) Field of Classification Search
CPC ...................................................... B60G 7/02
See application file for complete search history.

(56) References Cited

U.S. PATENT DOCUMENTS 4,660,851 A  *  4/1987  Perlini ................... F16C 11/06
                                                              280/124.11
2010/0025953 A1     2/2010  Buhl et al.

FOREIGN PATENT DOCUMENTS

JP          S61110610 A      5/1986
JP          H0522107 U   *   3/1993
JP          2001121931 A     5/2001
(Continued)

OTHER PUBLICATIONS

JPH0522107U Machine English Translation (Year: 1991).*

(Continued)

*Primary Examiner* — Jason D Shanske
*Assistant Examiner* — Matthew James O'Neill
(74) *Attorney, Agent, or Firm* — KENJA IP LAW PC

(57)          ABSTRACT

The elastic connection tool (1A) comprises a first mounting member (22) that is provided with a first mounting portion (21a) and a rotating shaft (21b), wherein the rotating shaft (21b) attached to a tip of the first mounting portion (21a); a second mounting member that is provided with a second mounting portion (22a) and a bracket (22b), wherein the bracket (22b) comprises a recess (C2) that accommodates the rotating shaft (21b) and an opening (A2) that allows the first mounting portion (21a) to pass through therein in a swingable manner; a first elastic member (23) that connects the rotating shaft (21b) and the bracket (22b); and a second elastic member (25) that covers a tip-side portion of the rotating shaft (21b).

6 Claims, 8 Drawing Sheets

(56)      References Cited

FOREIGN PATENT DOCUMENTS

| JP | 2010517870 A | 5/2010 |
| JP | 2011144891 A | 7/2011 |

OTHER PUBLICATIONS

Mar. 1, 2025, International Preliminary Report on Patentability issued in the International Patent Application No. PCT/JP2023/027280.

Sep. 26, 2023, International Search Report issued in the International Patent Application No. PCT/JP2023/027280.

* cited by examiner

FIG. 1

Upper side

Left side
(Suspension side)

Lower side

Right side
(Vehicle body side)

Upper side

Left side
(Suspension side)

Lower side

Right side
(Vehicle body side)

ELASTIC CONNECTION TOOL FOR SUSPENSION AND VEHICLE BODY MOUNT STRUCTURE FOR SUSPENSION

TECHNICAL FIELD

This disclosure relates to an elastic connection tool for a suspension and a vehicle body mount structure for the same. This application claims priority based on Japanese Patent Application No. 2022-157034, filed in Japan on Sep. 29, 2022, and the entire contents of which are incorporated herein by reference.

BACKGROUND

As an elastic connection tool for a suspension, a vibration-damping bushing is known, in which an outer sleeve is attached via an elastic member to a shaft having vehicle body side mounting portions at both ends (see, for example, Patent Document 1). Furthermore, Patent Document 1 discloses a vehicle body mount structure for a suspension in which the upper arm and the lower arm of a vehicle suspension are respectively mounted to the vehicle body by using the above-mentioned vibration-isolating bushing.

CITATION LIST

Patent Literature

PTL 1: JP 2011-144891 A

SUMMARY

Technical Problem

However, the conventional vibration-damping bushing described above requires the outer sleeve to be coupled to the suspension arm by welding or other methods, while the shaft must be attached to a bracket provided on the vehicle body using a fastening method such as bolts. For this reason, there is room for improvement in the above-mentioned conventional vibration-damping bushing in terms of reducing the number of parts and simplifying the structure.

The object of the present disclosure is to provide an elastic connection tool for a suspension and a vehicle body mount structure for the same that reduces the number of parts and simplifies the structure.

Solution to Problem (1) An elastic connection tool for a suspension according to the present disclosure comprises: a first mounting member that is provided with a first mounting portion that can be attached to either a vehicle body or wheel-side member and a suspension-side member, and a rotating shaft that extends in a direction intersecting the first mounting portion, wherein the rotating shaft is attached to a tip of the first mounting portion; a second mounting member that is provided with a second mounting portion that can be attached to the other of the vehicle body or wheel-side member and the suspension-side member, and a bracket that is continuous to the second mounting portion, wherein the bracket comprises a recess that accommodates the rotating shaft of the first mounting member and an opening that allows the first mounting portion of the first mounting member to pass through therein in a swingable manner; a first elastic member that connects the rotating shaft of the first mounting member and the bracket of the second mounting member; and a second elastic member that covers a tip-side portion of the rotating shaft on the side opposite to the first mounting portion. According to the elastic connection tool for a suspension in accordance with the present disclosure, the number of parts is reduced and the structure is simplified.

(2) In the elastic connection tool for a suspension as described in (1) above, the second elastic member may comprise a bore. In this case, the spring stiffness (spring constant) for input from the direction of extension of the first mounting portion can be adjusted.

(3) In the elastic connection tool for a suspension as described in (1) or (2) above, a pressing member that presses the second elastic member against the rotating shaft is further provided.

(4) A vehicle body mount structure for a suspension according to the present disclosure comprises the elastic connection tool for a suspension as described in any one of (1) to (3) above, and the other of the vehicle body or wheel-side member and the suspension-side member that is attached to the second mounting portion of the elastic connection tool for a suspension. According to the vehicle body mount structure for a suspension in accordance with the present disclosure, the number of parts is reduced and the structure is simplified.

(5) The vehicle body mount structure for a suspension as described in (4) above, wherein the second elastic member may have a curved surface that extends in a circumferential direction around a center axis line of the rotating shaft, and the other of the vehicle body or wheel-side member and the suspension-side member may comprise a curved surface that matches the curved surface of the second elastic member.

Advantageous Effect

According to the present disclosure, it is possible to provide an elastic connection tool for a suspension and a vehicle body mount structure for the same that reduces the number of parts and simplifies the structure.

BRIEF DESCRIPTION OF THE DRAWINGS

In the accompanying drawings:

FIG. 1 is a front view illustrating an initial state of a vehicle body mount structure for a suspension according to the first embodiment of the present disclosure, in which the vehicle body mount structure for a suspension uses an elastic connection tool for a suspension according to the first embodiment of the present disclosure to connect a suspension-side member and a vehicle body-side member;

FIG. 3 is a cross-sectional view along X1-X1 in FIG. 1;

FIG. 4 is a cross-sectional view along X2-X2 in FIG. 2;

FIG. 5 is a cross-sectional view illustrating an operating state of the vehicle body mount structure for a suspension in FIG. 4;

FIG. 6 is a cross-sectional view, equivalent to the cross-section along X1-X1 in FIG. 1, schematically illustrating an initial state of a vehicle body mount structure for a suspension according to the second embodiment of the present disclosure, in which the vehicle body mount structure for a suspension uses an elastic connection tool for a suspension according to the second embodiment of the present disclosure to connect the suspension-side member and the vehicle body-side member;

FIG. 7 is a cross-sectional view, equivalent to the cross-section along X2-X2 in FIG. 2, schematically illustrating an initial state of a vehicle body mount structure for a suspension according to the third embodiment of the present disclosure, in which the vehicle body mount structure for a suspension uses an elastic connection tool for a suspension according to the third embodiment of the present disclosure to connect the suspension-side member and the vehicle body-side member; and FIG. 8 is a cross-sectional view, equivalent to the cross-section along X1-X1 in FIG. 1, schematically illustrating an initial state of a vehicle body mount structure for a suspension according to the fourth embodiment of the present disclosure, in which the vehicle body mount structure for a suspension uses an elastic connection tool for a suspension according to the fourth embodiment of the present disclosure to connect the suspension-side member and the vehicle body-side member.

DETAILED DESCRIPTION

Figure 2:
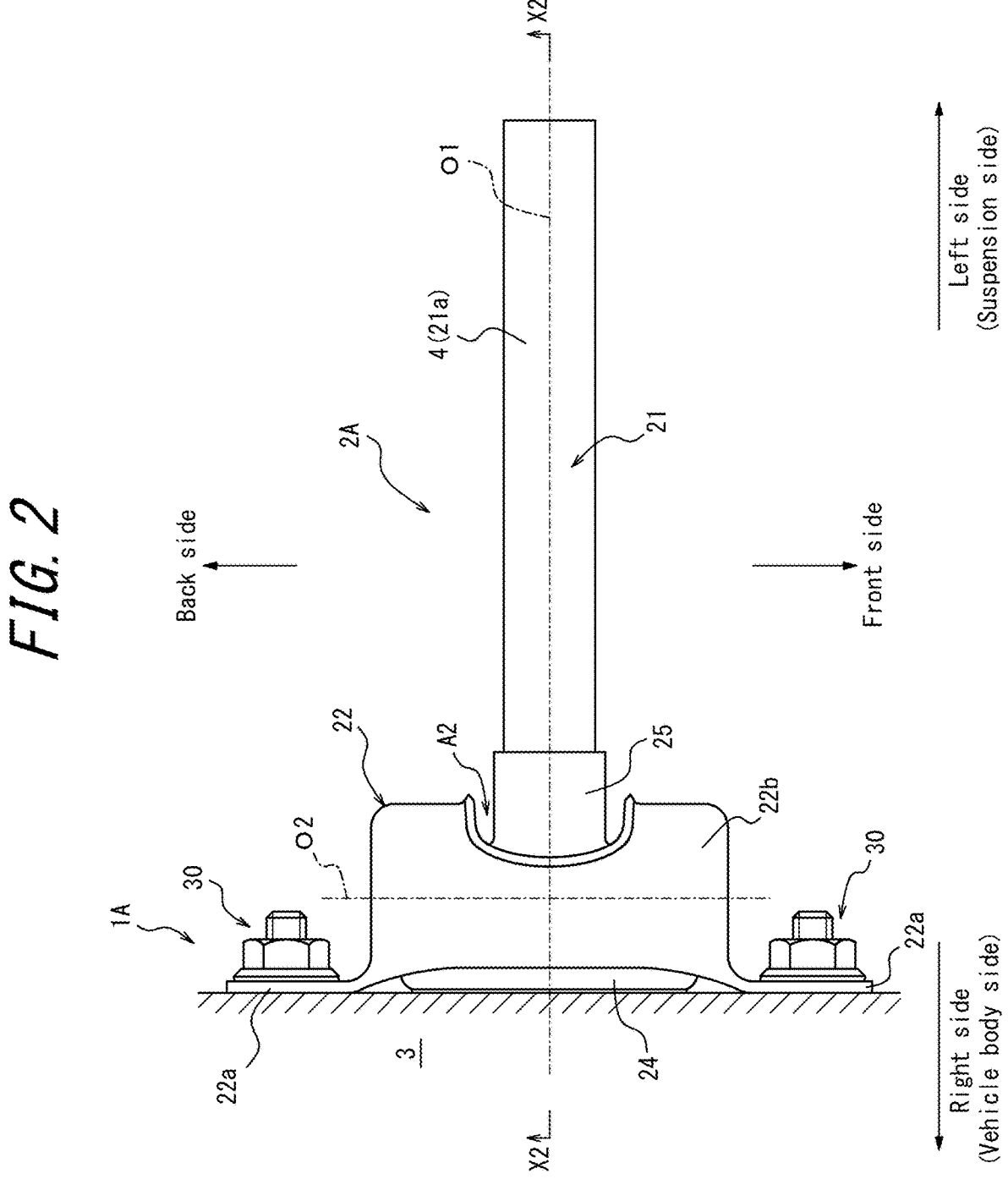
FIG. 2 is a plan view of the vehicle body mount structure for a suspension in FIG. 1.

The followings are explanations of the elastic connection tool for a suspension and the vehicle body mount structure for a suspension, referring to the drawings, according to various embodiments of the present disclosure. However, in the following explanations, the following definitions will be used, and the same symbols/numerals will be used for substantially identical parts.

The terms "up", "down", "front", "back", "left" and "right" shall refer to the positions when the object is positioned on the vehicle. In this embodiment, the elastic connection tool for a suspension is used for the front left wheel of the front suspension. In other words, in this embodiment, the vehicle body mount structure for a suspension shall be the structure adopted for the left front wheel of the front suspension. In addition, the initial state of the elastic connection tool for a suspension or the vehicle body mount structure for a suspension shall be the state when the vehicle is stopped.

Figure 1:
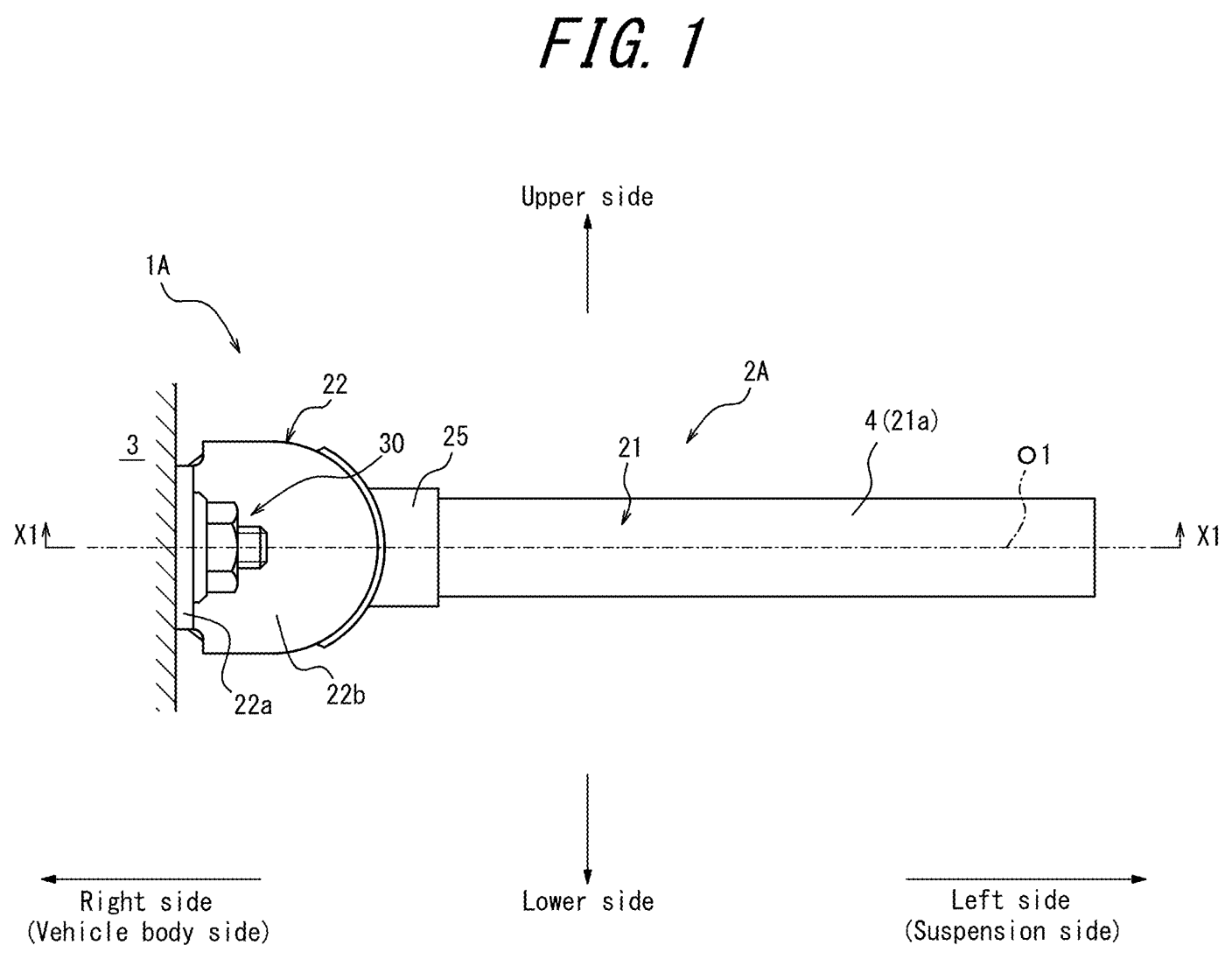

FIG. 1 schematically illustrates the initial state of a vehicle body mount structure for a suspension 1A (hereinafter, simply referred to as "vehicle body mount structure 1A") according to the first embodiment of the present disclosure, as seen from the front (up front). The vehicle body mount structure 1A comprises an elastic connection tool for a suspension 2A (hereinafter, simply referred to as "elastic connection tool 2A") according to the first embodiment of the present disclosure. The vehicle body mount structure 1A uses the elastic connection tool 2A to connect a vehicle body-side member 3 and a suspension-side member 4. The symbol O1 is the center axis line (extension axis line) of a first mounting member 21, which will be described later.

FIG. 2 illustrates the vehicle body mount structure 1A from above. Here, the vehicle body-side member 3 is a member that makes up all or part of the vehicle body. The suspension-side member 4 is a member that makes up all or part of the suspension arm. The suspension-side member 4 can be rotated in a circumferential direction around the rotation center line O2. In this embodiment, the rotation center line O2 is orthogonal to the center axis line of the first mounting member 21, O1 (hereinafter, simply referred to as the "center axis line O1").

Figure 3:
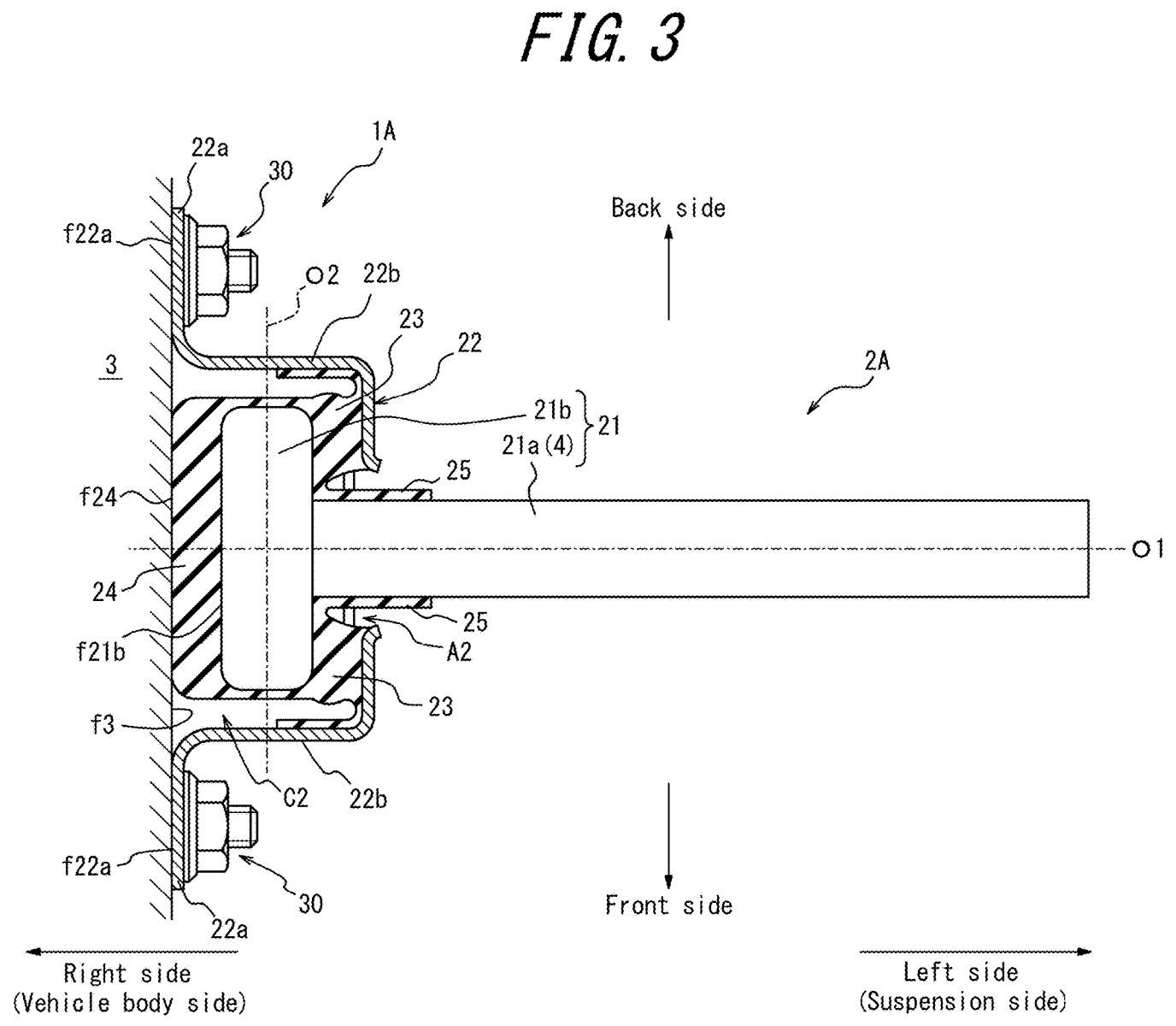

In FIG. 3, the vehicle body mount structure 1A is illustrated in a cross-section along X1-X1 in FIG. 1. The cross-section along X1-X1 is a plane that includes the center axis line O1 and the rotation center line O2 when the vehicle body mount structure 1A is in its initial state.

The elastic connection tool 2A is provided with the first mounting member 21. The first mounting member 21 is configured as follows.

The first mounting member 21 comprises a first mounting portion 21*a* that can be attached to either the vehicle body-side member 3 or the suspension-side member 4. In this embodiment, the first mounting portion 21*a* is attached to the suspension-side member 4. In this embodiment, the first mounting portion 21*a* is integrally configured with the suspension-side member 4. That is, in this embodiment, the suspension-side member 4 extends along the center axis line O1 together with the first mounting portion 21*a*. Furthermore, in this embodiment, the suspension-side member 4 constitutes all or part of the upper or lower arm of the front suspension. However, the first mounting portion 21*a* can be configured separately from the suspension-side member 4. Again, in this case, the suspension-side member 4 can constitute all or part of the upper or lower arm of the front suspension.

In addition to that, the first mounting member 21 comprises a rotating shaft 21*b* that extends in a direction intersecting the first mounting portion 21*a*. In this embodiment, the rotating shaft 21*b* can rotate in a circumferential direction around the rotation center line O2. In this embodiment, the rotating shaft 21*b* is a cylindrical shaft with the rotation center line O2 as the center axis line. The rotating shaft 21*b* is attached to the tip of the first mounting portion 21*a*. In this embodiment, the rotating shaft 21*b* is attached to the tip of the first mounting portion 21*a* on the vehicle body side. In this embodiment, the first mounting member 21 is composed of the first mounting portion 21*a* and the rotating shaft 21*b* as a single unit.

Next, the elastic connection tool 2A comprises a second mounting member 22. The second mounting member 22 is configured as follows.

The second mounting member 22 comprises a second mounting portion 22*a* that can be attached to the other of the vehicle body-side member 3 and the suspension-side member 4. In this embodiment, the second mounting portion 22*a* is attached to the vehicle body-side member 3. In this embodiment, the vehicle body-side member 3 constitutes all or part of the vehicle body. In this embodiment, the second mounting portion 22*a* has a mounting hole (not illustrated) that penetrates the second mounting portion 22*a*. The second mounting portion 22*a* can be coupled to the vehicle body-side member 3 by passing a fastening element 30, such as a screw, bolt, or pin, through the mounting hole. However, the second mounting member 22 can be attached to the vehicle body-side member 3 using a method other than the mounting hole.

In addition, the second mounting member 22 comprises a bracket 22*b* that is continuous to the second mounting portion 22*a*. In this embodiment, the bracket 22*b* is positioned between the two second mounting portions 22*a*. In this embodiment, the two second mounting portions 22*a* are arranged in the front-back direction of the bracket 22*b*. In this embodiment, the second mounting member 22 is composed of two second mounting portions 22*a* and a bracket 22*b* as a single unit. In this embodiment, the second mounting member 22 is configured by a plate-like member. The bracket 22*b* has a recess C2 that accommodates the rotating shaft 21*b* of the first mounting member 21. In addition, the bracket 22*b* comprises an opening A2 that allows the first mounting portion 21*a* of the first mounting member 21 to be passed through in a swingable manner. In this embodiment, the opening A2 is a slit hole that extends in a circumferential direction around the rotation center line O2. This allows the first mounting member 21 to swing around the rotational center line O2 in a circumferential direction along the opening A2.

Next, the elastic connection tool 2A comprises a first elastic member 23. The first elastic member 23 is configured as follows.

The first elastic member 23 connects the rotating shaft 21*b* of the first mounting member 21 and the bracket 22*b* of the second mounting member 22. In this embodiment, the first elastic member 23 is coupled to the bracket 22*b* at positions in front of and behind the first mounting portion 21*a* of the first mounting member 21.

Figure 4:
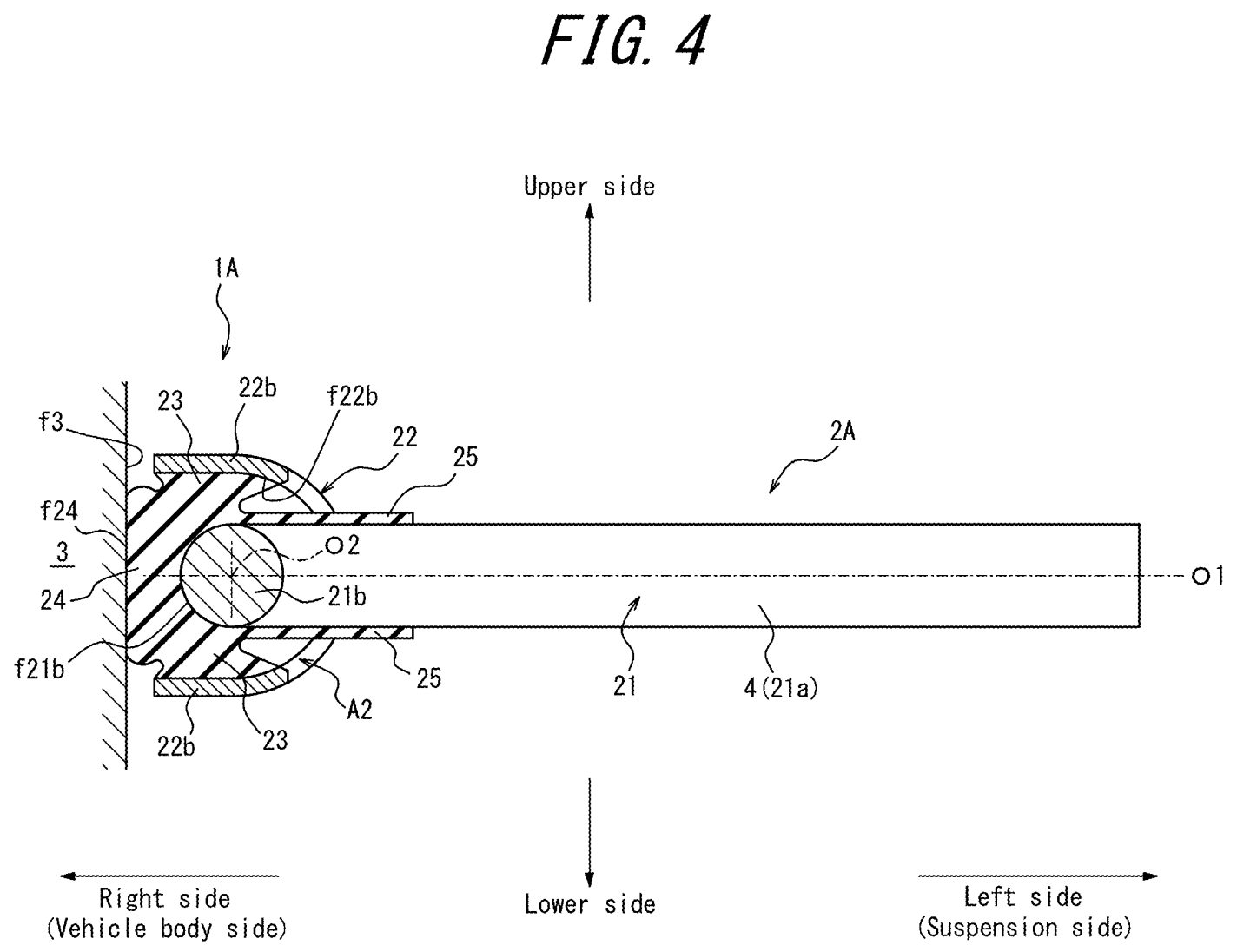

FIG. 4 illustrates the vehicle body mount structure 1A in a cross-section along X2-X2 in FIG. 2. The cross-section along X2-X2 is a plane that includes the center axis line O1 and the up-down axis line (in FIG. 2, the perpendicular line to the paper) when the vehicle body mount structure 1A is in its initial state. In this embodiment, the first elastic member 23 is coupled to the bracket 22*b* further in the up-down direction. In addition, in this embodiment, the first mounting portion 21*a* of the first mounting member 21 comprises a third elastic member 25 in the vicinity of the rotating shaft 21*b*. The third elastic member 25 extends from the rotating shaft 21*b* through the opening A2 of the bracket 22*b* and across the opening A2, as illustrated in FIG. 4. In addition, of the inner surface of the bracket 22*b*, the suspension-side inner surface f22*b*, is configured as a curved surface with a contour line that forms an arc with a curvature radius R (a curvature radius larger than the radius r of the rotating shaft 21*b*) centered on the rotation center line O2 of the rotating shaft 21*b*, as illustrated in the vertical cross-sectional view (front view in this embodiment) in FIG. 4.

In addition, the elastic connection tool 2A comprises a second elastic member 24. The second elastic member 24 is configured as follows.

The second elastic member 24 covers a tip-side portion of the rotating shaft 21*b* on the side opposite to the first mounting portion. In this embodiment, the second elastic member 24 covers the vehicle body-side tip portion of the rotating shaft 21*b*. In this embodiment, the second elastic member 24 covers the entire surface of a vehicle-body-side tip surface f21*b* of the rotating shaft 21*b* (in FIG. 4, at least the outer surface on the right half of the rotating shaft 21*b*). In addition, in this embodiment, the second elastic member 24 is integrally configured with the first elastic member 23. In this case, the second elastic member 24 can be treated as a single elastic member together with the first elastic member 23. However, the second elastic member 24 can also be configured separately from the first elastic member 23.

As illustrated in FIG. 4, the second elastic member 24 is arranged in a compressed state, between the vehicle body-side member 3 and the rotating shaft 21*b*, along the direction of extension of the center axis line O1 of the vehicle body-side member 3 between the vehicle body-side member 3 and the rotating shaft 21*b* when the second mounting member 22 is mounted on the vehicle body-side member 3. In other words, the first mounting member 21 (the suspension-side member 4) is initially pushed towards the suspension side (in this case, the left side) by the force (restoring force) of the second elastic member 24. Referring to FIG. 3, in this embodiment, the second elastic member 24 protrudes outward more than a vehicle body-side mounting surface f22 of the second mounting member 22 (in this embodiment, towards the vehicle body side) in a state before the elastic connection tool 2A is attached to the vehicle body-side member 3. As a result, the second elastic member 24 is arranged in a compressed state between the vehicle body-side member 3 and the bracket 22*b*, with the elastic connection tool 2A attached to the vehicle body-side member 3. In this embodiment, the vehicle body-side tip surface f24 of the second elastic member 24 is a flat surface, as is a mounting face f3 of the vehicle body-side member 3. However, as will be explained later, the vehicle body-side tip surface f24 of the second elastic member is not limited to a flat surface.

In the vehicle body mount structure 1A, when the first mounting member 21 is pushed into the vehicle body side along the center axis line O1, the rotating shaft 21*b* of the first mounting member 21 presses the mounting surface f3 of the vehicle body-side member 3 via the second elastic member 24. In response to this, the rotation shaft 21*b* of the first mounting member 21 is subjected to the force of the second elastic member 24 (restoring force) via second elastic member 24 from the mounting surface f3 of the vehicle body-side member 3, against the pressing force on the rotating shaft 21*b* and in the opposite direction to the pressing force. This allows the vehicle body mount structure 1A, which comprises the elastic connection tool 2A, to increase the spring stiffness (spring constant) for inputs from the direction of extension of the first mounting member 21 (direction of extension of the center axis line O1).

Figure 5:
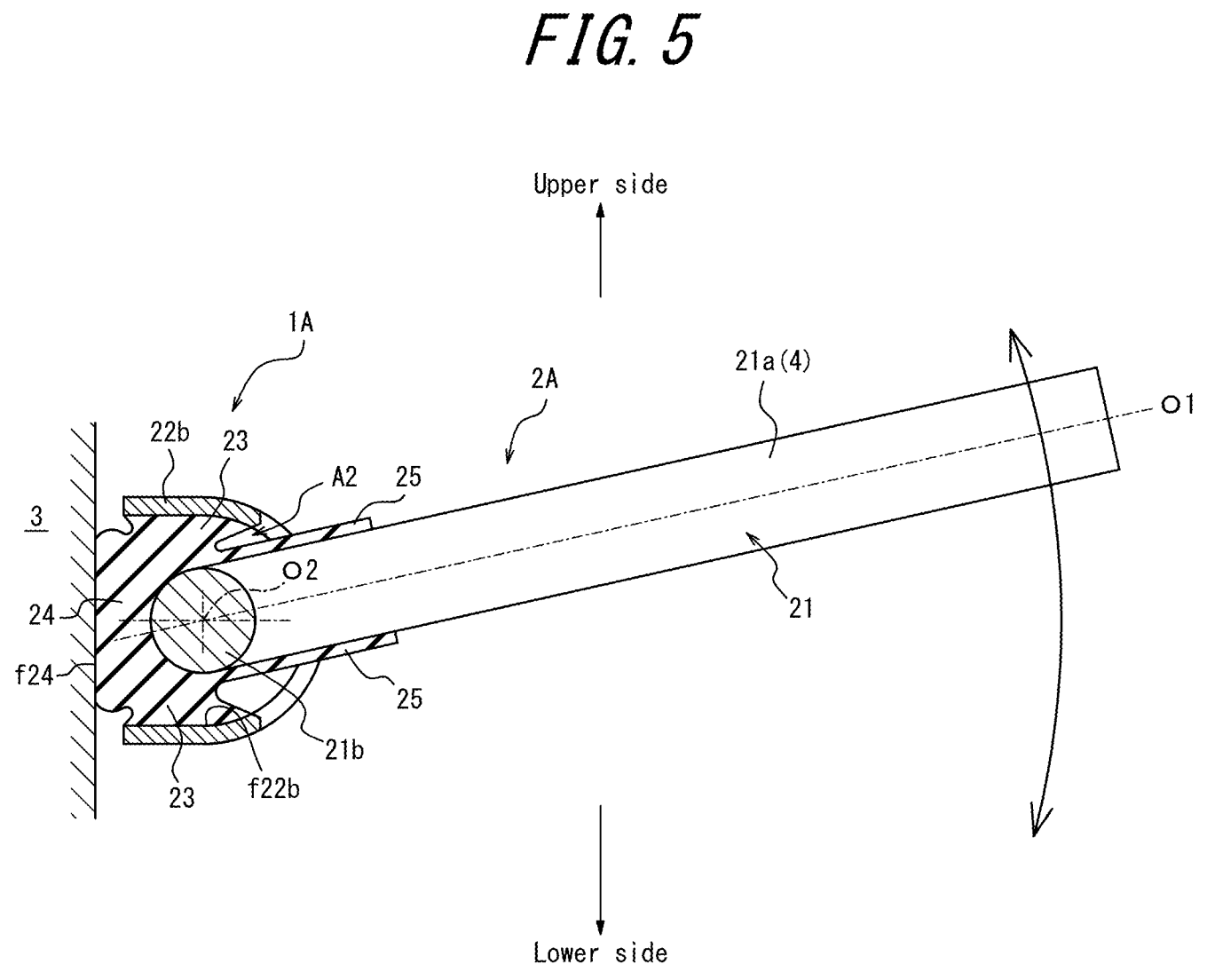

FIG. 5 schematically illustrates the operating state of the vehicle body mount structure 1A. As illustrated in FIG. 5, in the vehicle body mount structure 1A, when the wheel is lifted (when the vehicle body side is sunken), the first mounting member 21 (suspension-side member 4) swings (rotates) upwards around the rotation center line O2. At this time, the first elastic member 23 and the second elastic member 24 twist in a direction opposite to the swinging direction (rotating direction) of the first mounting member 21 around the rotation center line O2 between the rotating shaft 21*b* of the first mounting member 21 and the bracket 22*b* of the second mounting member 22. In other words, when the first mounting member 21 swings (rotates) upwards, the first elastic member 23 and the second elastic member 24 undergo shear deformation between the rotating shaft 21*b* of the first mounting member 21 and the bracket 22*b* of the second mounting member 22. According to the vehicle body mount structure 1A comprising the elastic connection tool 2A, when the first mounting member 21 swings upwards in a circumferential direction around the rotation center line O2, the torsional rigidity around the rotation center line O2 of the rotating shaft 21*b* can be increased.

In contrast, in the vehicle body mount structure 1A, when the wheel moves downwards (when the vehicle body lifts up), the first mounting member 21 (the suspension-side member 4) swings (rotates) downwards around the rotation center line O2. Even at this time, the first elastic member 23 and the second elastic member 24 twist in a direction opposite to the swinging direction (rotating direction) of the first mounting member 21 around the rotation center line O2 between the rotating shaft 21*b* of the first mounting member 21 and the bracket 22*b* of the second mounting member 22. In other words, when the first mounting member 21 swings (rotates) downwards, the first elastic member 23 and the second elastic member 24 also cause shear deformation between the rotating shaft 21*b* of the first mounting member 21 and the bracket 22*b* of the second mounting member 22. According to the vehicle body mount structure 1A comprising the elastic connection tool 2A, also when the first mounting member 21 swings downward in a circumferential direction around the rotation center line O2, the torsional rigidity of the rotating shaft 21b around the rotation center line O2 can be increased.

That is, the vehicle body mount structure 1A comprising the elastic connection tool 2A can demonstrate the same function as the conventional vibration-damping bushing (cylindrical bush) without using the cylindrical bushing. According to the conventional vehicle body mount structure using a cylindrical bushing, additional mounting brackets, etc. are required to attach the outer cylinder of the vibration-damping bushing to the vehicle body-side member 3. In contrast, according to the vehicle body mount structure 1A comprising the elastic connection tool 2A, the bracket 22b of the second mounting member 22 comprises the recess C2 with an open side on the mounting surface (in this embodiment, the mounting surface f3 of the vehicle body-side member 3), and the bracket 22b of the second mounting member 22 can be attached to the mounting surface (in this embodiment, the mounting surface f3 of the vehicle body-side member 3) with the second elastic member 24 exposed from the recess C2. Accordingly, the vehicle body mount structure 1A comprising the elastic connection tool 2A can reduce the number of parts compared to a cylindrical bushing, and can also simplify the elastic connection tool, that is the vehicle body mount structure. Therefore, according to the vehicle body mount structure 1A comprising the elastic connection tool 2A, it is possible to reduce the number of parts and simplify the structure. As a result, the vehicle body mount structure 1A comprising the elastic connection tool 2A can reduce weight and also reduce total cost.

By the way, in the vehicle body mount structure comprising the elastic connection tool, the second elastic member 24 can be provided with a bore. Here, the term "bore" refers to a recess or a through hole formed in the vehicle body-side tip surface f24 of the second elastic member 24. In this case, if the size, shape, etc. of the bore 27 are changed as appropriate, the spring stiffness (spring constant) for input from the direction of extension of the first mounting portion 21a can be adjusted.

Figure 6:
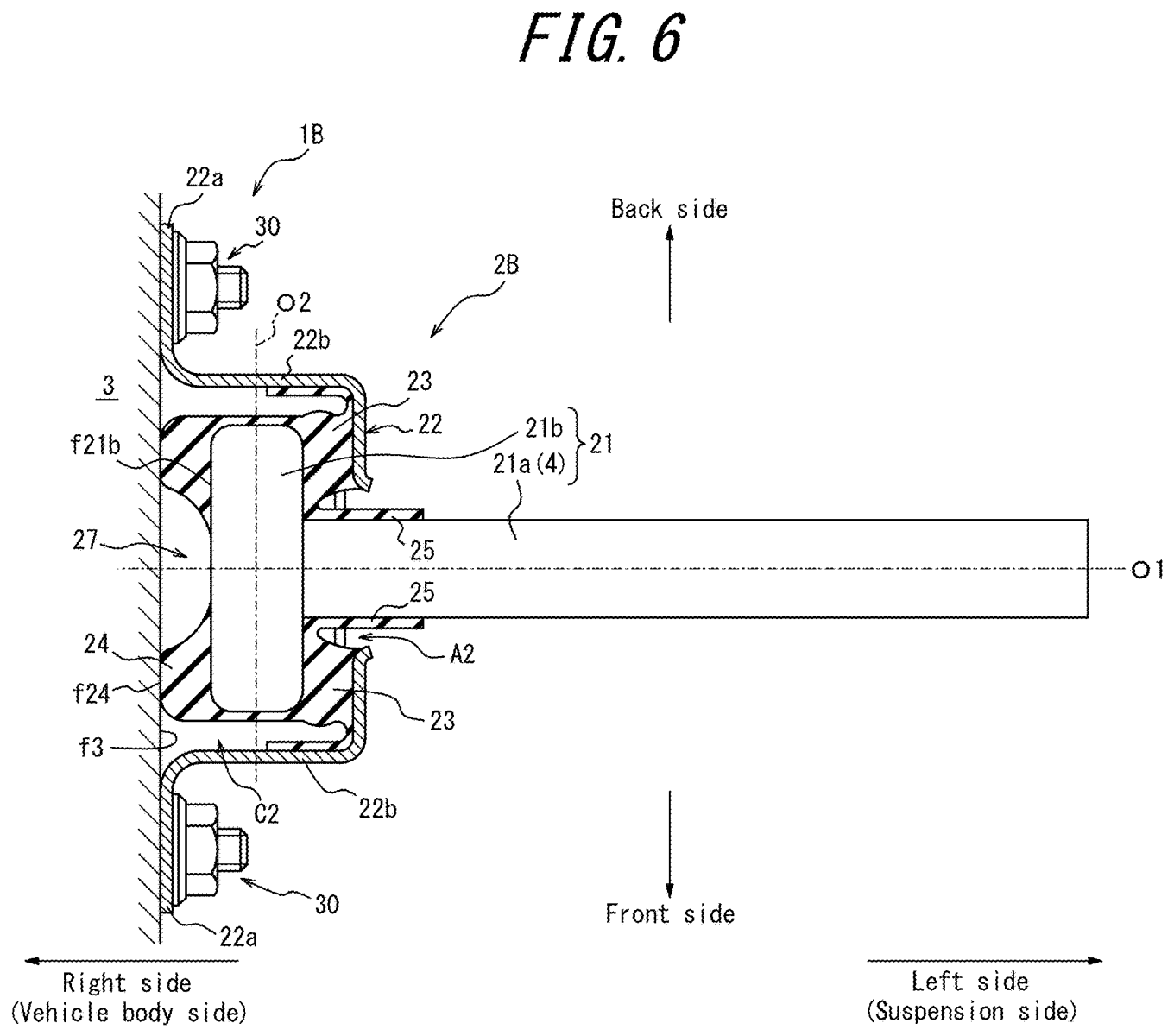

FIG. 6 schematically illustrates an initial state of the vehicle body mount structure for a suspension, 1B, (hereinafter, simply referred to as "vehicle body mount structure 1B") according to the second embodiment of the present disclosure, in a cross-sectional view equivalent to the cross-section along X1-X1 in FIG. 1. The vehicle body mount structure 1B connects the vehicle body-side member 3 and the suspension-side member 4 using the elastic connection tool for a suspension, 2B, (hereinafter, simply referred to as "elastic connection tool 2B") according to the second embodiment of the present disclosure.

As illustrated in FIG. 6, the second elastic member 24 of the elastic connection tool 2B is provided with a bore 27. If the bore 27 is provided on the second elastic member 24, the spring stiffness (spring constant) for input from the direction of extension of the first mounting portion 21a of the first mounting member 21 (direction of extension of the center axis line O1) can be kept low. Therefore, according to the vehicle body mount structure 1B comprising the elastic connection tool 2B, the spring stiffness (spring constant) for input from the direction of extension of the first mounting portion 21a can be adjusted, by appropriately changing the size, shape, etc. of the bore 27.

By the way, the second elastic member 24 can have a curved surface that extends in a circumferential direction around the rotation center line O2 of the rotating shaft 21b; and the vehicle body-side member 3 can be provided with a curved surface that matches the curved surface of the second elastic member 24. In this case, the spring stiffness (spring constant) against input from the direction of extension of the first mounting portion 21a can be increased, as well as the torsional stiffness around the rotation center line O2 of the rotating shaft 21b.

Figure 7:
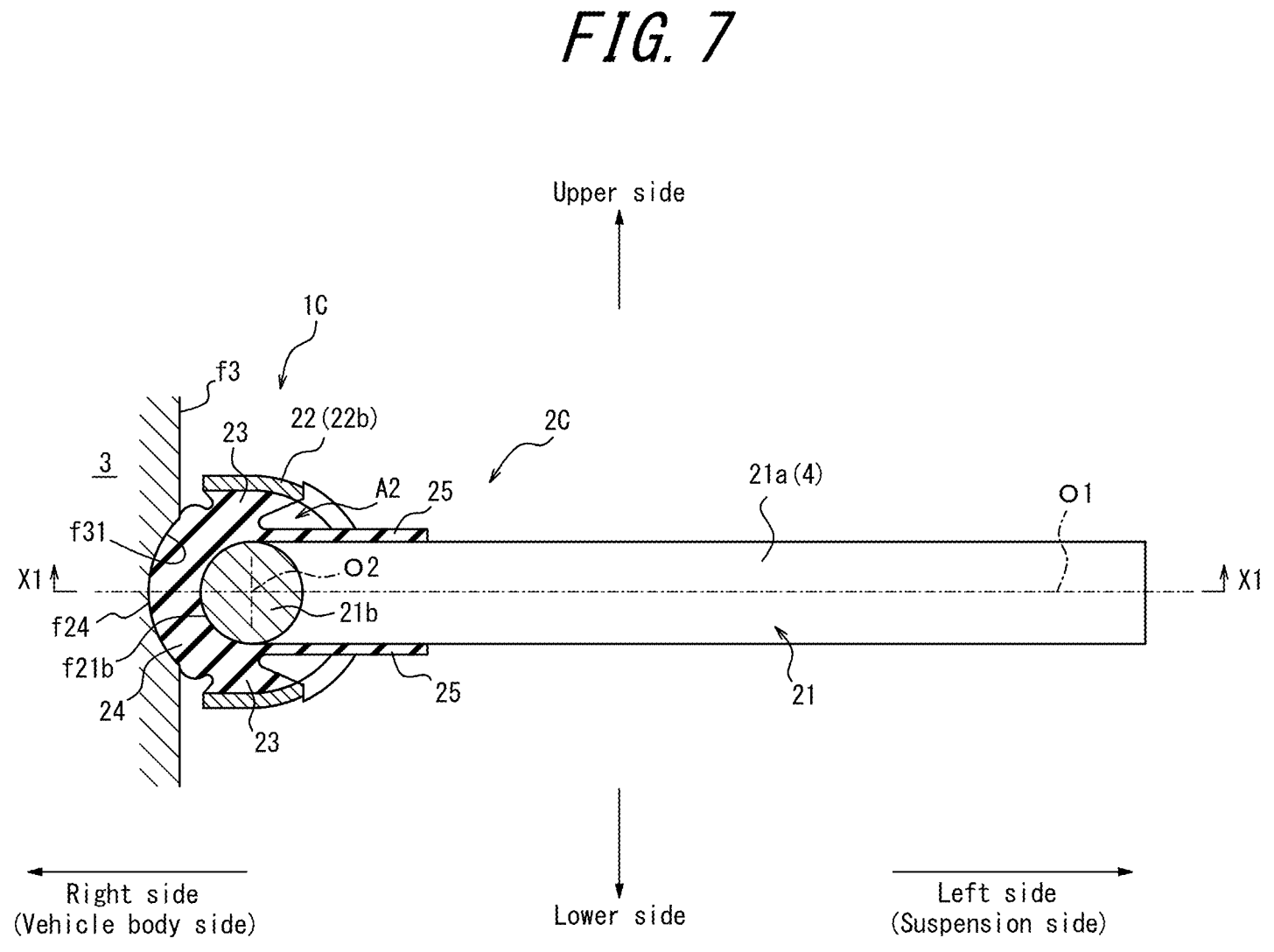

FIG. 7 schematically illustrates the vehicle body mount structure for a suspension, 1C, (hereinafter, simply referred to as "vehicle body mount structure 1C") according to the third embodiment of the present disclosure, in a cross-sectional view equivalent to the cross-section along X2-X2 in FIG. 2. The vehicle body mount structure 1C connects the vehicle body-side member 3 and the suspension-side member 4 using the elastic connection tool for a suspension, 2C, (hereinafter, simply referred to as "elastic connection tool 2C") according to the third embodiment of the present disclosure.

In the elastic connection tool 2C, the vehicle body-side tip surface f21b of the rotating shaft 21b is configured by a curved surface that extends in a circumferential direction around the rotation center line O2 of the rotating shaft 21b, in the vertical cross-sectional view (front view), as illustrated in FIG. 7. The curved surface protrudes toward the vehicle body side, and the mounting surface f3 of the vehicle body-side member 3 comprises a curved surface f31 that matches the vehicle body-side tip surface f24 of the second elastic member 24 in a vertical cross-sectional view (front view), as illustrated in FIG. 7. In this case, the spring stiffness (spring constant) against input from the direction of extension of the first mounting portion 21a can be increased, as well as the torsional stiffness around the rotation center line O2 of the rotating shaft 21b. In this example, the curved surface f31 of the vehicle body-side member 3 is a recess formed in the mounting surface f3 of the vehicle body-side member 3. The second elastic member 24 is arranged in a compressed state along the center axis line O1 between the vehicle body-side tip surface f21b of the rotating shaft 21b and the curved surface f31 of the vehicle body-side member 3, in the same way as in other embodiments. In this case, the second elastic member 24 is less likely to wear or shift along the mounting surface f3 of the vehicle body-side member 3, than when either the vehicle body-side tip surface f21b of the rotating shaft 21b or the curved surface f31 of the vehicle body-side member 3 is configured by a flat surface, since the second elastic member 24 is compressed evenly in the radial direction of the rotation center line O2 around the rotation center line O2 of the rotating shaft 21b. Therefore, according to the vehicle body mount structure 1C comprising the elastic connection tool 2C, it is possible to improve durability and to prevent slippage (in the up-down direction in this embodiment) against the mounting surface f3 of the vehicle body-side member 3.

Furthermore, the elastic connection tool for a suspension according to the present disclosure can be further provided with a pressing member 28 that presses the second elastic member 24 against the rotating shaft 23b. In this case, the second mounting member 22 can be attached while the second elastic member 23 is compressed, regardless of the shape of the mounting surface to which the second mounting member 22 is attached.

Figure 8:
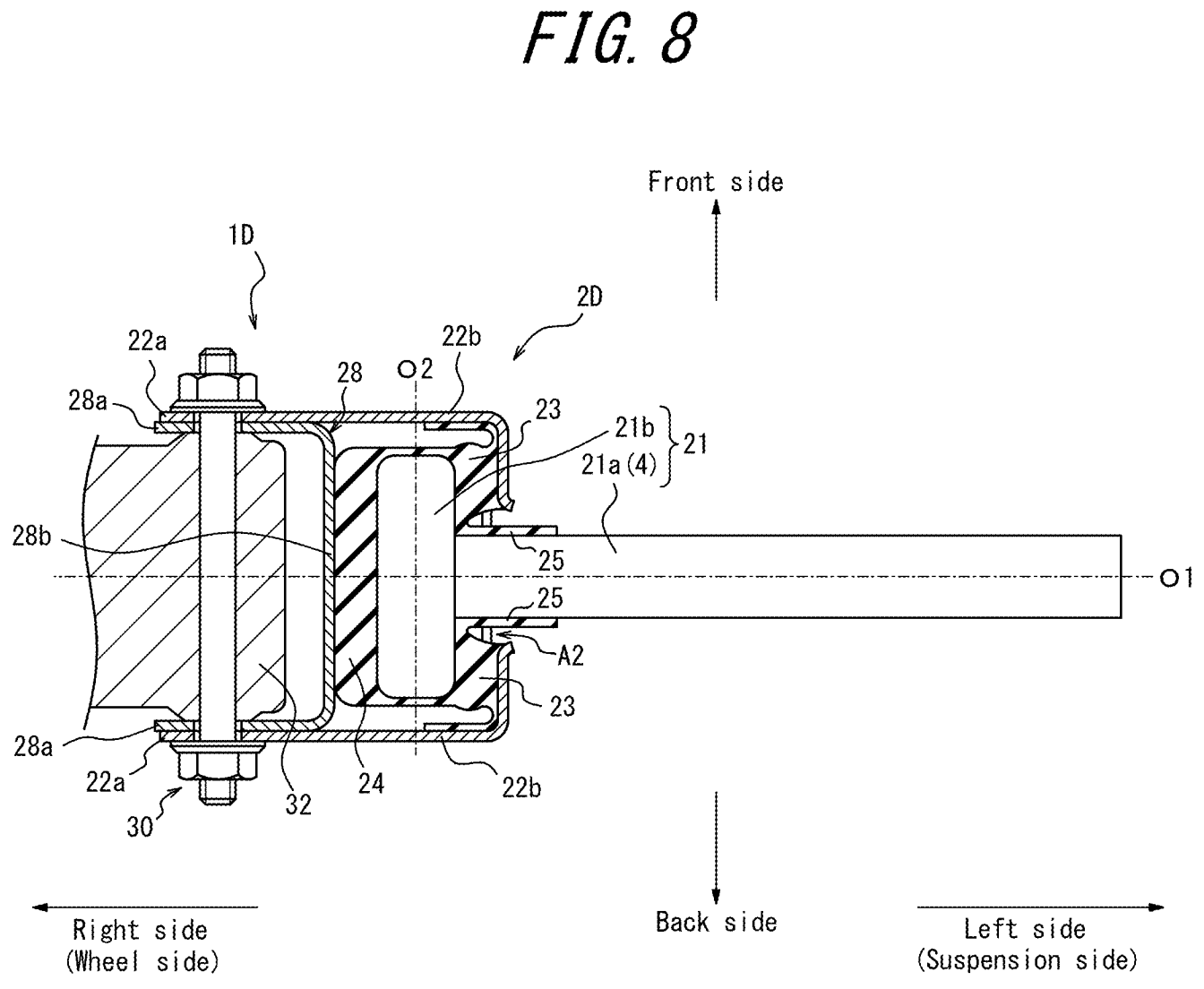

FIG. 8 illustrates an initial state of the vehicle body mount structure for a suspension, 1E, (hereinafter, simply referred to as "vehicle body mount structure 1E") according to the fourth embodiment of the present disclosure, in a cross-sectional view equivalent to the cross-section along X1-X1 in FIG. 1. The vehicle body mount structure 1E connects a wheel-side member 31 and the suspension-side member 4 using the elastic connection tool for a suspension, 2E, (hereinafter, simply referred to as "elastic connection tool 2E") according to the fourth embodiment of the present disclosure.

In FIG. 8, the numeral 32 is the wheel-side member. The wheel-side member 32 is a member connected to the wheel, such as a knuckle. Referring to FIG. 8, in the elastic connection tool 2E, the pressing member 28 is arranged inside the bracket 22*b*. The second elastic member 24 is arranged in a compressed state along the center axis line O1 between the rotating shaft 21*b* and the pressing member 28. In this embodiment, the pressing member 28 is provided with a mounting portion 28*a* that can be attached to the wheel-side member 32. In this embodiment, the pressing member 28 comprises two mounting portions 28*a*, and between these two mounting portions 28*a* is a pressing portion 28*b* that presses the second elastic member 24. The pressing member 28 is attached to the wheel-side member 32 together with the bracket 22*b* by a fastening element 30. This allows, according to the vehicle body mount structure 1E provided with the elastic connection tool 2E, the second mounting member 22 to be attached while the second elastic member 23 is compressed, regardless of the shape of the mounting surface to which the second mounting member 22 is attached.

The above only discloses some embodiments of the elastic connection tool for a suspension and the vehicle body mount structure for the same according to the present disclosure, and various modifications are possible according to the scope of the claims. The various configurations used in the above-mentioned embodiments can be used in combination with each other.

REFERENCE SIGNS LIST

1A Vehicle body mount structure for a suspension (First embodiment)
1B Vehicle body mount structure for a suspension (Second embodiment)
1C Vehicle body mount structure for a suspension (Third embodiment)
1D Vehicle body mount structure for a suspension (Fourth embodiment)
2A Elastic connection tool for a suspension (First embodiment)
1B Elastic connection tool for a suspension (Second embodiment)
1C Elastic connection tool for a suspension (Third embodiment)
1D Elastic connection tool for a suspension (Fourth embodiment)
3 Vehicle body—side member
32 Wheel—side member
4 Suspension—side member
21 First mounting member
21*a* First mounting portion
21*b* Rotating shaft
f21*b* Vehicle body-side tip surface of rotating shaft 21*b*
22 Second mounting member
22*a* Second mounting portion
22*b* Bracket
A2 Opening
23 First elastic member
24 Second elastic member
f24 Vehicle body-side tip surface of second elastic member
25 Third elastic member
27 Bore

10

28 Pressing member
C2 Recess
O1 Center axis line of first mounting member
O2 Rotation center line of rotating shaft

The invention claimed is:

1. An elastic connection tool for a suspension, comprising:
   a first mounting member that is provided with a first mounting portion that is configured to be attached to either a vehicle body or wheel-side member and a suspension-side member, and a rotating shaft that extends in a direction intersecting the first mounting portion, wherein the rotating shaft is attached to a tip of the first mounting portion;
   a second mounting member that is provided with a second mounting portion that is configured to be attached to the other of the vehicle body or wheel-side member and the suspension-side member, and a bracket that is continuous to the second mounting portion, wherein the bracket comprises a recess that accommodates the rotating shaft of the first mounting member and an opening that allows the first mounting portion of the first mounting member to pass through therein in a swingable manner;
   a first elastic member that connects the rotating shaft of the first mounting member and the bracket of the second mounting member; and
   a second elastic member that covers a tip-side portion of the rotating shaft on the side opposite to the first mounting portion,
   wherein the first mounting member is composed of the first mounting portion and the rotating shaft as a single unit and
   wherein the second elastic member is arranged in a compressed state between the rotating shaft and a mounting surface of the second mounting member and comprises a bore between the rotating shaft and the mounting surface of the second mounting member and
   wherein the bore is opened directed to the mounting surface of the second mounting member.

2. The elastic connection tool for a suspension as described in claim 1, further comprising a pressing member that presses the second elastic member against the rotating shaft.

3. A vehicle body mount structure for a suspension, comprising the elastic connection tool for a suspension as described in claim 1, and the other of the vehicle body or wheel-side member and the suspension-side member that is attached to the second mounting portion of the elastic connection tool for a suspension.

4. The vehicle body mount structure for a suspension as described in claim 3, wherein
   the second elastic member has a curved surface that extends in a circumferential direction around a center axis line of the rotating shaft, and
   the other of the vehicle body or wheel-side member and the suspension-side member comprises a curved surface that matches the curved surface of the second elastic member.

5. A vehicle body mount structure for a suspension, comprising the elastic connection tool for a suspension as described in claim 2, and the other of the vehicle body or wheel-side member and the suspension-side member that is attached to the second mounting portion of the elastic connection tool for a suspension.

6. The vehicle body mount structure for a suspension as described in claim 5, wherein the second elastic member has a curved surface that
  extends in a circumferential direction around a center
  axis line of the rotating shaft, and
the other of the vehicle body or wheel-side member and
  the suspension-side member comprises a curved sur-
  face that matches the curved surface of the second
  elastic member.

\*  \*  \*  \*  \*